(12) United States Patent
Müller

(10) Patent No.: US 8,302,273 B2
(45) Date of Patent: Nov. 6, 2012

(54) JOINING UNIT

(75) Inventor: Alexander Müller, Lorch (DE)

(73) Assignee: Kistler Holding AG, Winterthur (CH)

( * ) Notice: Subject to any disclaimer, the term of this patent is extended or adjusted under 35 U.S.C. 154(b) by 873 days.

(21) Appl. No.: 12/373,844

(22) PCT Filed: Jul. 18, 2006

(86) PCT No.: PCT/EP2006/007029
§ 371 (c)(1),
(2), (4) Date: Jan. 14, 2009

(87) PCT Pub. No.: WO2008/009299
PCT Pub. Date: Jan. 24, 2008

(65) Prior Publication Data
US 2010/0005639 A1    Jan. 14, 2010

(51) Int. Cl.
B23B 5/28 (2006.01)
B23P 19/04 (2006.01)
B23P 11/00 (2006.01)
B25B 27/00 (2006.01)
B25B 27/14 (2006.01)

(52) U.S. Cl. .... 29/256; 29/238; 29/243.521; 29/243.53; 29/252; 29/255; 29/278; 29/270

(58) Field of Classification Search .................. 29/238, 29/243.521, 243.53, 252, 255, 256, 270, 29/278
See application file for complete search history.

(56) References Cited

U.S. PATENT DOCUMENTS

| 5,555,897 | A | * | 9/1996 | Lathrop et al. ............. 5/600 |
| 5,587,633 | A | | 12/1996 | Aoki et al. |
| 6,182,521 | B1 | | 2/2001 | Kerner et al. |
| 6,293,155 | B1 | | 9/2001 | Babiel |
| 2001/0010783 | A1 | * | 8/2001 | Desmoulins ................ 408/10 |
| 2001/0042643 | A1 | * | 11/2001 | Krueger et al. ............. 175/73 |
| 2005/0035653 | A1 | * | 2/2005 | Godlewsky et al. ...... 303/122.03 |
| 2006/0207079 | A1 | * | 9/2006 | Mauer et al. ............... 29/243.53 |

FOREIGN PATENT DOCUMENTS

| DE | 20108706 | 9/2001 |
| DE | 20305789 | 7/2003 |
| DE | 102004054835 | 5/2006 |

OTHER PUBLICATIONS

English translation of International Preliminary Examination Report on Patentability, issued Mar. 9, 2009.

* cited by examiner

*Primary Examiner* — Lee D Wilson
*Assistant Examiner* — Nirvana Deonauth
(74) *Attorney, Agent, or Firm* — Dority & Manning, P.A.

(57) ABSTRACT

A joining unit contains a spindle drive in the form of a hollow shaft motor that encloses a spindle. The hollow shaft motor serves to achieve a linear movement of a joining tool for the execution of a joining process. The joining unit contains instruments for the presetting and/or determination of the forces exerted and/or the movement of the joining tool during the joining process.

38 Claims, 4 Drawing Sheets

JOINING UNIT

CROSS-REFERENCE TO RELATED APPLICATIONS

This application claims priority to International Application Serial No. PCT/EP2006/007029 filed Jul. 18, 2006.

STATEMENT REGARDING FEDERALLY SPONSORED RESEARCH OR DEVELOPMENT

N/A

NAMES OF A PARTY TO A JOINT RESEARCH AGREEMENT

N/A

INCORPORATION-BY-REFERENCE OF MATERIAL SUBMITTED ON A COMPACT DISC

N/A

TECHNICAL FIELD

The invention relates to a joining unit containing a spindle drive in the form of a hollow shaft motor that encloses a spindle to achieve a linear movement of a joining tool for the execution of a joining process.

BACKGROUND

A joining unit of this type is known from DE 203 05 789 U1.

The joining unit described therein contains a spindle drive for the generation of a linear movement of a joining tool. The spindle drive is formed by a hollow shaft motor that encloses a spindle.

The hollow shaft motor is embodied as an electric drive and encompasses a stator as well as a rotor which is firmly attached to the spindle. The rotor causes the spindle to execute a rotational movement.

For the generation of the linear movement of the joining tool a plunger is provided that forms the lower surface of a tubular housing insert having an interior space through which a portion of the spindle extends. A nut is provided at the upper side of the housing that engages a thread at the lateral surface area of the spindle. Due to this coupling, the rotational movement of the spindle is directly converted into a longitudinal movement of the plunger and, therefore, of the joining tool.

It is an advantage of this joining unit that the conversion of the rotational movement of the spindle drive into a linear movement does not require any gearing.

Therefore, the joining unit shows a simple and cost-effective construction.

It is an essential disadvantage of such joining units that the functional control thereof is primarily performed via external units. Although in the joining unit itself are provided position sets which control the time course of the velocity of the joining tool in accordance with target positions relative to the workpiece to be processed, it is necessary to perform the activation of the respective position set via an external unit such as for example an SPS control.

Furthermore, using such external units it is known to perform a power cut-off as a protection against damages of the joining tool or of the workpiece. In a power cut-off of this type an emergency shut-off of the joining unit is actuated via the external unit if a maximum allowable force is exceeded that acts on the spindle. Due to the time required for the processing of the signal in the external unit as well as the time for signal transmission between the joining unit and the external unit, it may be possible that the emergency shut-off is not actuated in time thus resulting in damage to components of the joining unit due to excessive straining by force.

Moreover, a system in which essential control functions are performed by external units is relatively complex and, therefore, difficult to handle by the user.

BRIEF OBJECTS AND SUMMARY OF THE INVENTION

The object underlying the present invention is a joining unit of the type mentioned in the beginning that not only has a high functionality and safety of use but also a simple and cost-effective construction.

To achieve this object the features according to an embodiment of the invention include instruments for the presetting and/or determination of the forces exerted during the joining process and/or the movement of the joining tool. Advantageous embodiments and purposeful modifications of the invention are described in the dependent claims.

The joining unit according to the invention comprises a spindle drive in the form of a hollow shaft motor that encloses a spindle and which serves to achieve a linear movement of a joining tool for the execution of a joining process. The joining unit comprises instruments for the presetting and/or determination of the forces exerted during the joining process and/or the movement of the joining tool.

In the joining unit according to the invention, essential functions required for the control and presetting of the joining process are integrated into the joining unit itself. In particular, the overall control of the time course of the joining process is integrated in the joining unit itself making it a closed and largely self-sufficient system. The joining unit embodied in this manner has a high functionality besides a compact construction and is furthermore easily handled by an operator.

Because the spindle drive according to the invention is embodied in the form of a hollow shaft motor, no gearing is necessary for driving the joining tool so that the joining unit has a small overall installed size and can be fabricated at reasonable costs. Moreover, a drive of this type can be well controlled and its dynamics are high. In addition, no constraint as to the rotational speed on the input side is exercised during the operation of such a gear-less drive. And, because there is no gear there is the additional advantage of having one less wear part that would require maintaining. In general, since a gear always has a certain gear play, a higher positioning accuracy can be achieved by using joining units that have gear-less drives than by using systems which function with gears.

It is particularly advantageous that essential functions for the sequential control and the control of the joining process are integrated into a controller of the hollow shaft motor that has the form of an electric drive.

In particular, not merely position sets for presetting the time course of the joining process can be stored in this controller but rather the position sets can also be activated in the controller itself so that no external units are required for sequential control.

Furthermore, the controller can carry out control functions for the monitoring or recording, respectively, of the joining process wherein in this case signals of a speed sensor for the determination of the current rotational position of the spindle and of a force sensor that measures the forces acting on the spindle or the joining tool, respectively, are evaluated within the controller.

In particular, for this purpose a force/displacement evaluation can be performed within the controller for recording and testing the quality of the joining process.

Furthermore, a closed-loop force control can be integrated into the controller which serves to prevent damages to components of the joining units in the case of high force spikes. It is particularly advantageous to perform the closed-loop force control in a manner that in addition to a closed-loop velocity control, also the target position that has to be approached by the joining tool as predetermined in the currently activated position set will be adjusted against the current processing direction. In this manner, reversing the direction of the joining tool is initiated and, thus, a collision of the joining tool with an obstacle is prevented.

The closed-loop force control is integrated in the controller of the electric drive so that no external units are required for this purpose, and a quick execution of the closed-loop force control is ensured.

In a particularly advantageous embodiment, the joining unit comprises a limit stop switch-off that results in a shut-off of the electric drive in the case of unacceptably high forces and thus protects the joining unit from damages. It is particularly advantageous if the limit stop switch-off contains the spring bearing of a force sensor whereby unacceptably high forces can be sensed by deflection of the spring bearing. The limit stop switch-off formed in this manner not only has a simple and robust construction but at the same time protects the force sensor from damages.

In another useful embodiment the joining unit comprises a holding brake by means of which a secure holding of the spindle in its set position is ensured also during a power failure and in the case of a high weight of the joining tool.

It is particularly advantageous if the joining unit has a modular construction with respect to its mechanical components. In particular, modular entities are formed by the housing that accommodates the electric drive and the spindle and by the spindles so that the joining unit can be configured for different strokes of the joining tools without any effort.

In general, the joining unit according to the invention can be used for all types of joining processes. The joining unit can be particularly used for positional joining wherein a part, for example a bearing, is joined up to a predetermined introduction depth into a receptacle, for example a bearing seating. Furthermore, the joining unit can be used to perform block joining wherein a part is assembled into a receptacle up to a collar or, in general, up to an arrest.

Moreover, the joining unit can be used in joining processes related to transformation technique, i.e., in so-called joining by shearing and upsetting or by clinching. In such joining processes, positive connections are formed by means of clinching of at least two joining parts. The clinching is performed in connection with cutting or force fitting and subsequent cold upsetting of the joining parts.

In general, the spindle drive according to the invention can also be used for the generation of linear movements of other tools.

Moreover, the joining unit may also be used for orbital riveting or stamping of parts.

BRIEF DESCRIPTION OF THE DRAWINGS

In the following, the invention will be explained with respect to the drawings in which.

DETAILED DESCRIPTION OF EXEMPLARY EMBODIMENTS

Figure 1:
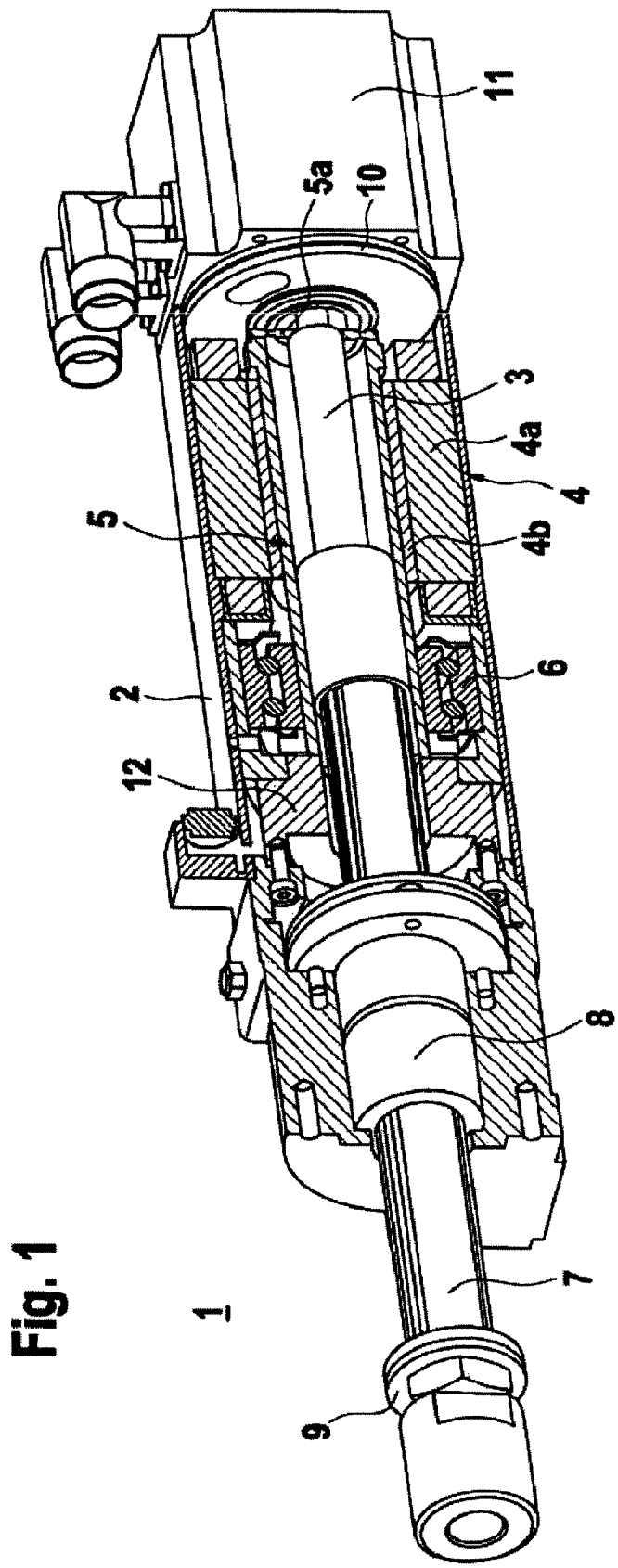
FIG. 1: shows a perspective view of an example of a joining unit.

FIG. 1 shows an example of a joining unit 1. The joining unit 1 is integrated into an axially symmetric housing 2.

A spindle 3 is placed in the interior of the housing 2 the longitudinal axis of which extends in the axis of symmetry of the housing 2. Preferably, the spindle 3 is embodied as a ball bearing screw or a planetary roller drive.

Driving of the spindle 3 is performed by means of a hollow shaft motor 4 and, thus, without any use of a gear. The hollow shaft motor 4 is in the form of an electric drive. In the present case, the electric drive is embodied as a servo motor. The stator 4a of the electric drive is arranged at the inner wall of the housing 2 and concentrically with the spindle axis. A tubular body 5 is firmly connected with the spindle 3. The tubular body 5 is essentially in the form of a hollow cylinder the lateral surface of which is arranged concentrically with and in a predetermined distance to the spindle 3. At its front face the tubular body 5 contains a connecting piece 5a in the form of a flange by means of which the tubular body 5 is firmly attached to the spindle 3. At its opposite end along its length the tubular body 5 is rotatably supported by means of a bearing 6.

The rotor 4b is mounted on the outer surface of the tubular body 5 in the form of an assembly of permanent magnets. The rotor 4b is disposed opposite to the stator 4a of the electric drive.

Adjoined to the free end along the length of the spindle 3 and extending coaxially and firmly connected therewith is a plunger 7 that is guided in a guide bush 8 which guide bush 8 is supported in the anterior portion of the housing 2. The anterior end along the length of the plunger 7 protrudes beyond the front face of the housing 2. At this free end of the plunger 7, a joining tool 9 for performing a joining process is attached.

A rotational movement of the spindle 3 is caused by means of the electric drive via the tubular body 5. By means of the guide bush 8 this rotational movement of the spindle 3 is transformed into a displacement movement of the plunger 7 in the direction of the longitudinal axis of the plunger 7 because the guide bush 8 not merely acts as a guide but also as a torsion protection for the plunger 7. Due to this linear movement of the plunger 7, the joining tool 9 conducts a corresponding stroke movement for carrying out a joining process.

As can be seen from FIG. 1, a disc-shaped holding brake 10 is provided in the posterior portion of the housing 2. By means of the holding brake 10 the spindle is kept securely in its position, especially if the weight of the joining tool 9 is high or if the drive shuts off in the case of a power failure, respectively.

Adjoined to the rear end of the tubular housing 2 is a housing projection 11 at which terminals for connecting a controller (not shown) are provided. The controller is a component of the electric drive and serves for the control thereof.

Furthermore, the controller also performs the control of the whole controlling unit. For this purpose, signals of a speed sensor integrated into the housing protrusion are input in the controller. The speed sensor carries out the determination of the current angular position of the spindle 3 as well as its rotational speed. In addition, a force sensor 12 is provided that encloses the plunger 7 and the signals of which are also input in the controller. By means of the force sensor 12 the forces acting on the plunger 7 and, thus, on the joining tool 9 or the spindle 3, respectively, are determined. The force sensor may contain strain gauges or piezo sensors as the sensor elements.

The control of the time course of the joining process to be carried out by means of the joining unit 1 is performed in the controller. Position sets are stored as operation parameters for process control within the controller, and individual position sets are activated one after the other in the controller for presetting the joining process. Each position set contains the target position to be approached by the joining tool 9 as well as the velocity of the joining tool 9 by which the target position is approached.

Figure 2:
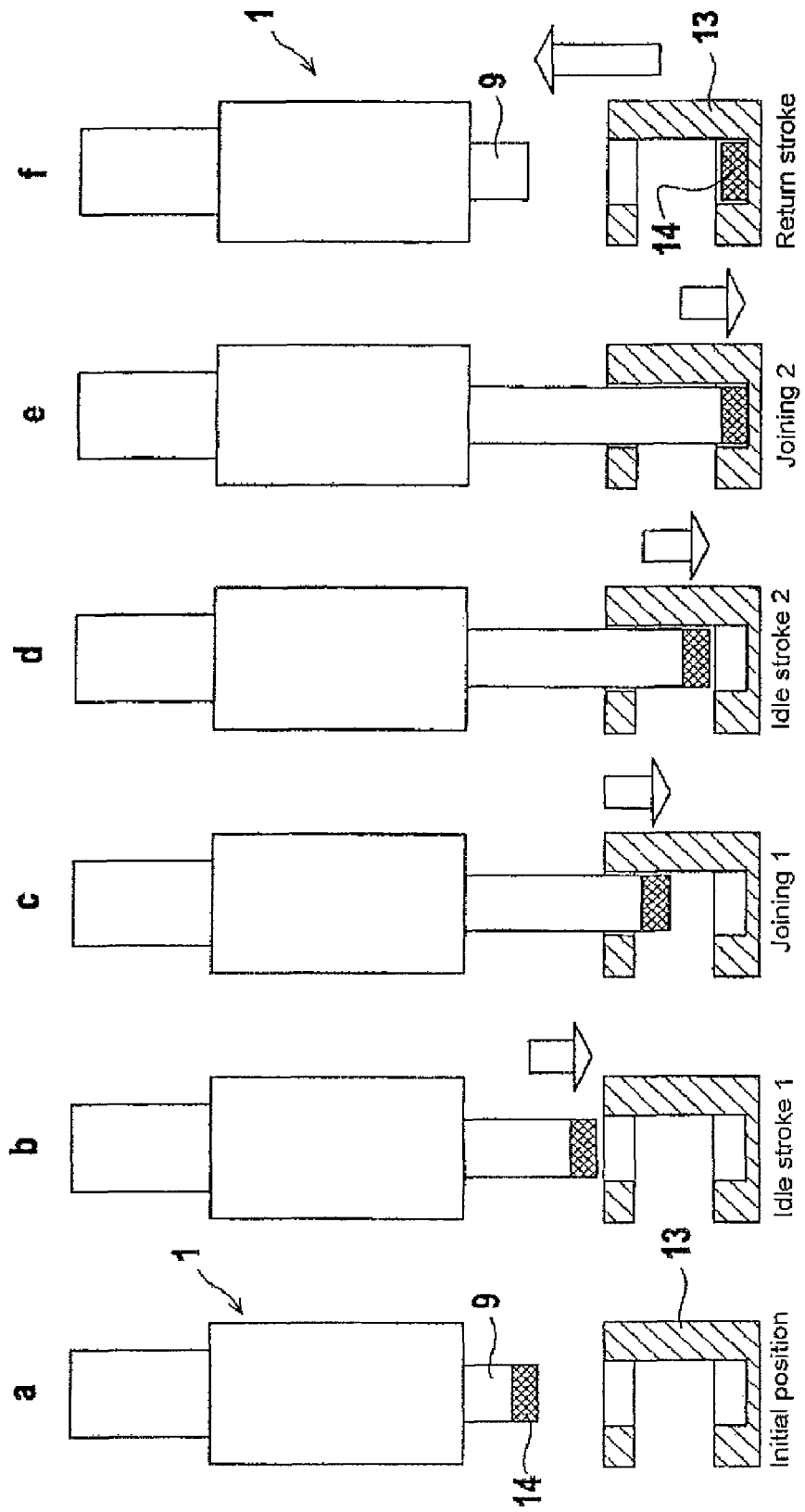
FIG. 2: shows a schematic representation of the time course of a joining process that is conducted with the joining unit according to FIG. 1.
Figure 3:
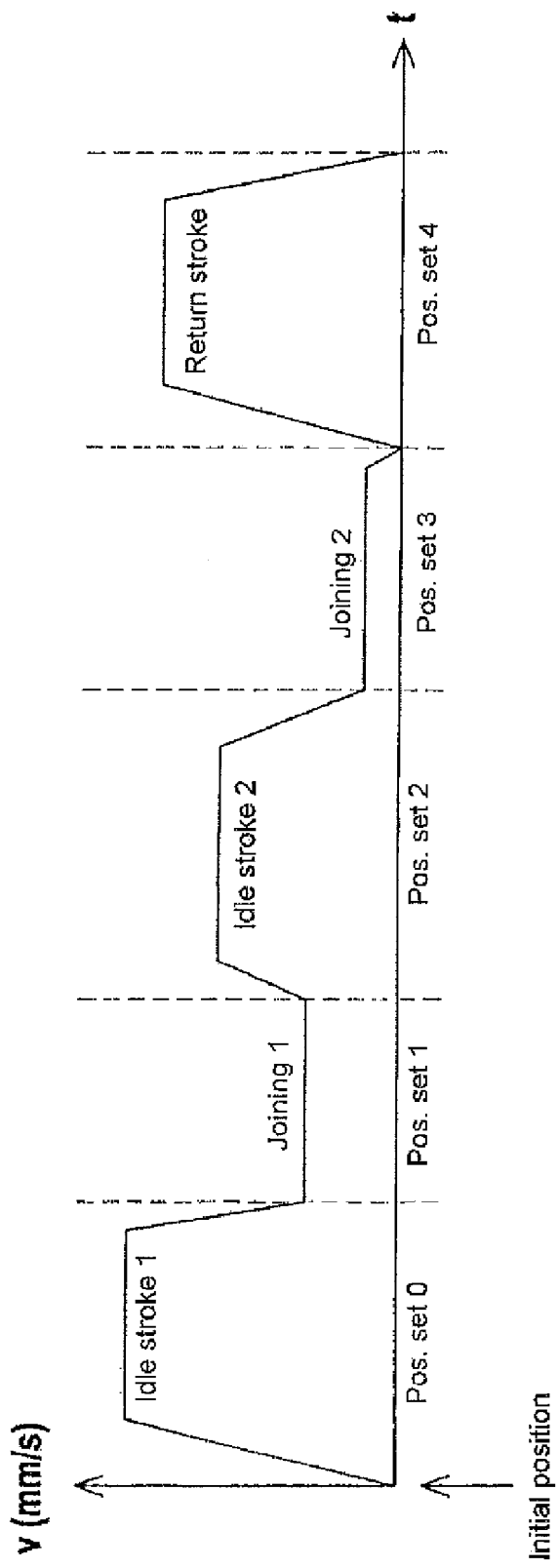
FIG. 3: represents the operational profile of the joining tool of the joining unit in the joining process according to FIG. 2.

An example for a joining process of this type is illustrated in FIGS. 2 and 3. FIG. 2 represents the different phases of the joining process that are referred to as a to f. FIG. 3 shows the different velocities of the joining tool 9 for these phases.

FIG. 2 shows individually for each of the phases a to f of the joining process the position and optionally also the movement of the joining unit 1 containing the joining tool 9 relative to a mount 13 that serves for the accommodation of the workpiece 14 to be processed.

The joining process starts from an initial position of the joining unit 1 (phase a) in which the joining tool 9 is not moved and is disposed at a distance from the mount 13.

During the following phase b, a position set 0 is activated so that the joining tool 9 is advanced to the mount 13 with a first velocity as defined in the position set and without the workpiece 14 as demonstrated in FIGS. 2, 3. This phase is designated as idle stroke 1.

In phase c (joining 1) a joining process is simulated wherein the joining tool 9 is inserted in the mount 13 with a second velocity as predetermined in position set 1.

This is followed by phase d (idle stroke 2) in which the joining tool 9 is moved with a velocity as defined in position set 2.

During phase e (joining 2) the joining of the workpiece 14 is carried out with the velocity as defined in position set 3.

A return stroke is subsequently performed in phase f with a velocity as defined in position set 4 during which the joining tool 9 is removed again from the mount.

Figure 4:
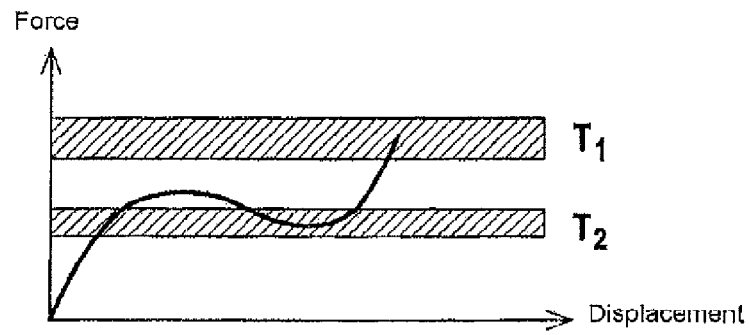
FIG. 4: shows an example of a force/displacement diagram for a joining process which can be conducted with the joining unit according to FIG. 1.

Furthermore, also a force/displacement evaluation is performed within the controller. In this case, by evaluating the signals of the speed sensor and of the force sensor the force path is determined in accordance with the path traveled by the joining tool 9. The corresponding data can be output from the controller to an external unit for the visualization of this force path. An example of such a diagram is shown in FIG. 4. Such force/displacement diagrams serve to monitor and control the quality of the joining process. In the example according to FIG. 4 two ranges of tolerance $T_1, T_2$ are given. An accurate joining process is obtained if the corresponding force in specific path areas falls within the tolerance ranges.

Moreover, a closed-loop force control is integrated into the controller. Due to this closed-loop force control, the velocity and also the current target position in the current position set are altered if the force measured by the force sensor 12 exceeds a predetermined threshold value. In this case it will be particularly advantageous to alter the target position against the current operating direction of the joining tool 9. The velocity change and the target position change are performed in a range that has been specifically predetermined by the user for the respective application. A force exceeding the threshold value is for example encountered if the joining tool 9 collides with an obstacle. Since the target position is changed against the processing direction of the joining tool 9, a reversal of the joining tool 9 is achieved by means of the closed-loop force control whereby the obstacle is avoided and damages to components of the joining unit 1 can be prevented, i.e., an overload protection is achieved for the joining unit 1.

Figure 5:
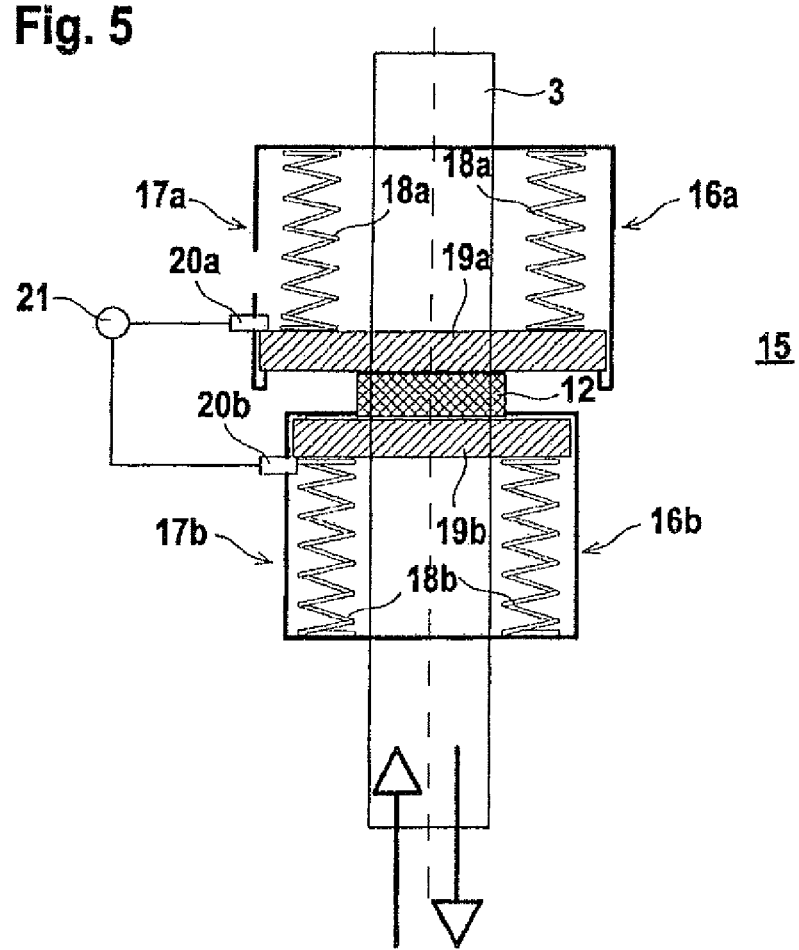
FIG. 5: shows a schematic representation of the components of a limit stop switch-off for the joining unit according to FIG. 1.

FIG. 5 shows an example of a limit stop switch-off 15 that can be integrated into the joining unit 1 according to FIG. 1. FIG. 5 represents a force sensor 12 that encloses the spindle 3 of the joining unit 1. Alternatively, as shown in FIG. 1, the force sensor can enclose the plunger 7.

The force sensor 12 according to FIG. 5 is resiliently supported by means of a spring bearing. The spring bearing consists of two spring assemblies 16a, b extending in axial direction of the spindle 3 on both sides of the force sensor 12. The spring assemblies 16a, b each contain springs 18a, b supported in a chamber 17a, b wherein the bottom 19a, b of each chamber 17a, b is slidable against the upper portion of the chamber 17a, b against the spring forces.

The springs 18a, b of each spring assembly 16a, b are pretensioned with a pretension force wherein each pretension force corresponds to a limit value. The limit value G is defined as $$G=N+T$$

wherein N is the nominal joining force and T is a positive tolerance value.

Assigned to each of the spring assemblies 16a, b are switches 20a, b wherein in the present case the switches 20a, b are embodied as openers. The signals from the switches 20a, b are transferred to an inverter 21 via which they are input in the controller.

If the force acting on the force sensor 12 exceeds the limit value the springs 18a, b of the first or second spring assembly 16a, b are deflected in dependence on the direction of the force so that the switch 20a or b, respectively, of the respective spring assembly 16a or b is actuated. This signal is input to the controller that executes an emergency stop of the joining unit 1. Due to this limit stop switch-off, the joining unit 1 is protected from force spikes that exceed the nominal joining force.

By means of the limit stop switch-off 15 especially the force sensor 12 can be protected from overload. If the spindle is in the form of a ball bearing screw, this can also be protected from overload.

The invention claimed is:

1. A joining unit comprising:
a housing defining an interior,
a spindle and a rotor placed in the interior of the housing,
a spindle drive in the form of a hollow shaft motor for driving the spindle without any use of a gear, whereas the spindle defines an axis of rotation and the hollow shaft motor encompasses a stator which is disposed concentrically with the spindle axis of rotation as well as the rotor, which is firmly attached to the spindle,
whereas the hollow shaft motor encloses the spindle to achieve a linear movement of a joining tool for the execution of a joining process, and instruments placed in the interior of the housing for the presetting or determination of the forces exerted during the joining process or the movement of the joining tool.

2. A joining unit comprising:
a housing defining an interior,
a spindle and a rotor placed in the interior of the housing,
a spindle drive in the form of a hollow shaft motor for driving the spindle without any use of a gear,
whereas the spindle defines an axis of rotation and the hollow shaft motor encompasses a stator which is disposed concentrically with the spindle axis of rotation as well as the rotor, which is firmly attached to the spindle, the hollow shaft motor enclosing the spindle to achieve a linear movement of a joining tool for the execution of a joining process, and
a force sensor placed in the interior of the housing, which force sensor is formed by at least one piezo sensor.

3. The joining unit according to claim 1 wherein the hollow shaft motor contains an electric drive having a controller for the control thereof wherein in said controller are integrated at least a part of the instruments for the presetting or determination of the forces exerted during the joining process or the movement of the joining tool.

4. The joining unit according to claim 1, wherein the hollow shaft motor contains an electric drive and the instruments include a force sensor and wherein said joining unit contains a speed sensor for the determination of the current rotational position of the spindle driven by the electric drive and wherein the force sensor serves for the determination of the forces acting on the joining tool.

5. The joining unit according to claim 3, wherein position sets are stored in the controller where they can be activated for the presetting of joining processes.

6. The joining unit according to claim 4, wherein the hollow shaft motor contains a controller for the control thereof and wherein a force/displacement evaluation of the joining process is performed in the controller in dependence on the signals of the speed sensor and the force sensor.

7. The joining unit according to claim 3, wherein a closed-loop control unit is integrated in the controller for performing a closed-loop force control.

8. The joining unit according to claim 7 wherein the controller is provided with a currently activated position set that includes a target position that has to be approached by the joining tool as predetermined in the currently activated position set and wherein during closed-loop force control the target position predetermined in the currently activated position set is changed if the force as determined by the force sensor exceeds a predetermined threshold value.

9. The joining unit according to claim 8 wherein the joining tool has an operating direction and wherein during closed-loop force control the change of the target position is carried out against the operating direction of the joining tool.

10. The joining unit according to claim 8, wherein during closed-loop force control the velocity of the joining tool is changed in dependence on the force determined by the force sensor.

11. The joining unit according to claim 1, wherein the hollow shaft motor contains an electric drive and wherein said joining unit contains a limit stop switch-off for performing an emergency stop of the electric drive.

12. A joining unit comprising:
a housing defining an interior, a spindle placed in the interior of the housing, a spindle drive in the form of a hollow shaft motor that encloses the spindle to achieve a linear movement of a joining tool for the execution of a joining process, and instruments placed in the interior of the housing for the presetting or determination of the forces exerted during the joining process or the movement of the joining tool;
wherein the hollow shaft motor contains an electric drive and wherein said joining unit contains a limit stop switch-off for performing an emergency stop of the electric drive; and
wherein the limit stop switch-off is actuated if the force acting on the joining tool exceeds a limit value.

13. The joining unit according to claim 12 wherein for the presetting of the limit value a spring bearing is provided for the force sensor which is formed by two spring assemblies, one of said spring assemblies being arranged in longitudinal direction of the spindle on each side of the force sensor wherein the pretension of the springs of the spring assemblies corresponds to said limit value.

14. The joining unit according to claim 12, wherein the limit value corresponds to the sum of the nominal joining force and a tolerance value.

15. The joining unit according to claim 13, wherein a switch is assigned to each spring assembly wherein each switch generates a switch signal that is evaluated in the controller with respect to the actuation of the emergency stop if the limit value for any of the spring assemblies is exceeded.

16. The joining unit according to claim 1, wherein said joining unit contains a holding brake that acts on the spindle.

17. The joining unit according to claim 1, wherein the mechanical components of the housing, the motor and the spindle have a modular construction so that they can be adapted to different strokes of the joining tool to be performed during the joining process.

18. The joining unit according to claim 3, wherein the electric drive forming the hollow shaft motor contains a stator supported in a housing as well as a rotor mounted on a tubular body that is firmly attached to and enclosing the spindle.

19. The joining unit according to claim 18 wherein adjoined to the spindle is a plunger extending coaxially with the spindle at the free end of which the joining tool can be mounted and further characterized in that the plunger is guided in a guide bush supported in the housing whereby the rotational movement of the spindle caused by the electric motor is transformed into a longitudinal movement of the plunger.

20. The joining unit according to claim 19 wherein the spindle and the housing have a modular construction.

21. The joining unit according to claim 2 wherein the hollow shaft motor contains an electric drive having a controller for the control thereof wherein in said controller are integrated at least a part of the instruments for the presetting or determination of the forces exerted during the joining process or the movement of the joining tool.

22. The joining unit according to claim 2 wherein said joining unit contains a speed sensor for the determination of the current rotational position of the spindle driven by the electric drive and wherein the force sensor serves for the determination of the forces acting on the joining tool.

23. The joining unit according to claim 21 wherein position sets are stored in the controller where they can be activated for the presetting of joining processes.

24. The joining unit according to claim 22 wherein a force/displacement evaluation of the joining process is performed in the controller in dependence on the signals of the speed sensor and the force sensor.

25. The joining unit according to claim 21 wherein a closed-loop control unit is integrated in the controller for performing a closed-loop force control.

26. The joining unit according to claim 25 wherein during closed-loop force control the target position predetermined in the currently activated position set is changed if the force as determined by the force sensor exceeds a predetermined threshold value.

27. The joining unit according to claim 26 wherein during closed-loop force control the change of the target position is carried out against the operating direction of the joining tool.

28. The joining unit according to claim 26 wherein during closed-loop force control the velocity of the joining tool is changed in dependence on the force determined by the force sensor.

29. The joining unit according to claim 2 wherein said joining unit contains a limit stop switch-off for performing an emergency stop of the electric drive.

30. The joining unit according to claim 29 wherein the limit stop switch-off is actuated if the force acting on the joining tool exceeds a limit value.

31. A joining unit comprising:
a housing defining an interior, a spindle placed in the interior of the housing, a spindle drive in the form of a hollow shaft motor enclosing the spindle to achieve a linear movement of a joining tool for the execution of a joining process, and a force sensor placed in the interior of the housing, which force sensor is formed by at least one piezo sensor;
wherein said joining unit contains a limit stop switch-off for performing an emergency stop of the electric drive;
wherein the limit stop switch-off is actuated if the force acting on the joining tool exceeds a limit value; and
wherein for the presetting of the limit value a spring bearing is provided for the force sensor which is formed by two spring assemblies arranged in longitudinal direction of the spindle, one said spring assembly being on each side of the force sensor wherein the pretension of the springs of the spring assemblies corresponds to said limit value.

32. The joining unit according to claim 30 wherein the limit value corresponds to the sum of the nominal joining force and a tolerance value.

33. The joining unit according to claim 31 wherein a switch is assigned to each spring assembly wherein each switch generates a switch signal that is evaluated in the controller with respect to the actuation of the emergency stop if the limit value for any of the spring assemblies is exceeded.

34. The joining unit according to claim 2 wherein said joining unit contains a holding brake that acts on the spindle.

35. The joining unit according to claim 2 wherein the mechanical components of the housing, the motor and the spindle have a modular construction so that they can be adapted to different strokes of the joining tool to be performed during the joining process.

36. The joining unit according to claim 21 wherein the electric drive forming the hollow shaft motor contains a stator supported in a housing as well as a rotor mounted on a tubular body that is firmly attached to and enclosing the spindle.

37. The joining unit according to claim 36 wherein adjoined to the spindle is a plunger extending coaxially with the spindle at the free end of which the joining tool can be mounted and wherein the plunger is guided in a guide bush supported in the housing whereby the rotational movement of the spindle caused by the electric motor is transformed into a longitudinal movement of the plunger.

38. The joining unit according to claim 37 wherein the components having a modular construction are formed by the spindle and the housing.

\* \* \* \* \*